United States Patent

[11] 3,579,075

[72] Inventor Linton E. Floyd
 Gainesville, Fla.
[21] Appl. No. 752,543
[22] Filed Aug. 14, 1968
[45] Patented May 18, 1971
[73] Assignee General Electric Company

[54] COMPACT BATTERY CHARGER FOR RECHARGEABLE BATTERIES OF VARIOUS PHYSICAL SIZES AND ELECTRICAL CAPABILITIES
12 Claims, 10 Drawing Figs.

[52] U.S. Cl. .................................................. 320/2, 320/15, 320/48, 320/59
[51] Int. Cl. .................................................. H02j 7/02
[50] Field of Search............................ 320/2, 15—18, 20, 48, 49, 51, 53—55, 57, 59

[56] References Cited
UNITED STATES PATENTS
3,307,096 2/1967 Lyons............................ 320/15
1,194,500 8/1916 Horton......................... 320/15
2,375,866 5/1945 Nelms et al. ................. 320/2
3,209,230 9/1965 Mas............................... 320/2
3,217,227 11/1965 Sherwood..................... 320/2(UX)
3,281,637 10/1966 Hultquist...................... 320/2
3,391,321 7/1968 Ota................................ 320/2
3,435,318 3/1969 Mas............................... 320/48X Primary Examiner—James D. Trammell
Assistant Examiner—John M. Gunther
Attorneys—Nathan J. Cornfeld, John P. Taylor, Frank L. Neuhauser, Oscar B. Waddell and Melvin M. Goldenberg ABSTRACT: A portable device for simultaneously charging a plurality of batteries of different electrical and physical characteristics. The input power consists of standard household alternating current which is converted within the device to half-wave rectified current. A plurality of current limiting charging circuits is provided and an included housing is formed with battery retaining recesses sized to mechanically discriminate each battery so that it will connect only with the corresponding circuit which has been designed to provide a proper charging current for the corresponding batteries.

Patented May 18, 1971

INVENTOR.
LINTON E. FLOYD
BY
HIS ATTORNEY

INVENTOR.
LINTON E. FLOYD

HIS ATTORNEY

Patented May 18, 1971

INVENTOR:
LINTON E. FLOYD

BY John P. Taylor

HIS ATTORNEY

INVENTOR.
LINTON E. FLOYD
HIS ATTORNEY

INVENTOR.
LINTON E. FLOYD

BY
HIS ATTORNEY

COMPACT BATTERY CHARGER FOR RECHARGEABLE BATTERIES OF VARIOUS PHYSICAL SIZES AND ELECTRICAL CAPABILITIES

The invention relates to apparatus for recharging batteries and more specifically, to a simple household device for recharging secondary-type storage batteries. In a specific embodiment it refers to the recharging of nickel-cadmium batteries requiring specific charge currents.

An increasing number of battery operated items such as radios, children's toys, hearing aids, flashlights and the like are being offered to the public. These may be operated by primary cells (dry cells) or by rechargeable secondary cells. Due to the cost of continual replenishment of dry cells it is desirable to use a secondary or rechargeable cell. The use of such secondary cells permits the use of a battery recharger. However, due to the widening range of sizes and electrical characteristics of the cells utilized in such battery operated devices, the problem of providing a single recharger device to service all the battery needs of a household has become correspondingly complicated.

It is therefore an object of this invention to provide a single device for charging at least three popular size cells commonly denominated as the AA, C and D sizes.

It is another object of this invention to provide a single device which will simultaneously charge one or more pairs of batteries of different electrical characteristics.

It is still another object of this invention to provide a foolproof battery charging device which will insure proper direction of charging current flow into the cells and which will automatically charge each cell with its proper charge current.

In carrying out the invention in the preferred form, a battery charging device is provided having an electrical charging circuit comprising a plurality of branches. Each branch is connected with impedance means so that each circuit carries an optimum charge current for a corresponding battery. The charging device is provided with a housing which is formed with a plurality of battery retaining recesses, each of which is sized to accommodate one or more battery sizes. The charger is physically designed to insure that a battery inserted therein completes only that branch of the charging circuit electrically designed for that size batter.

The invention will be further understood by referring to the following description and accompanying drawings in which.

Figure 1:
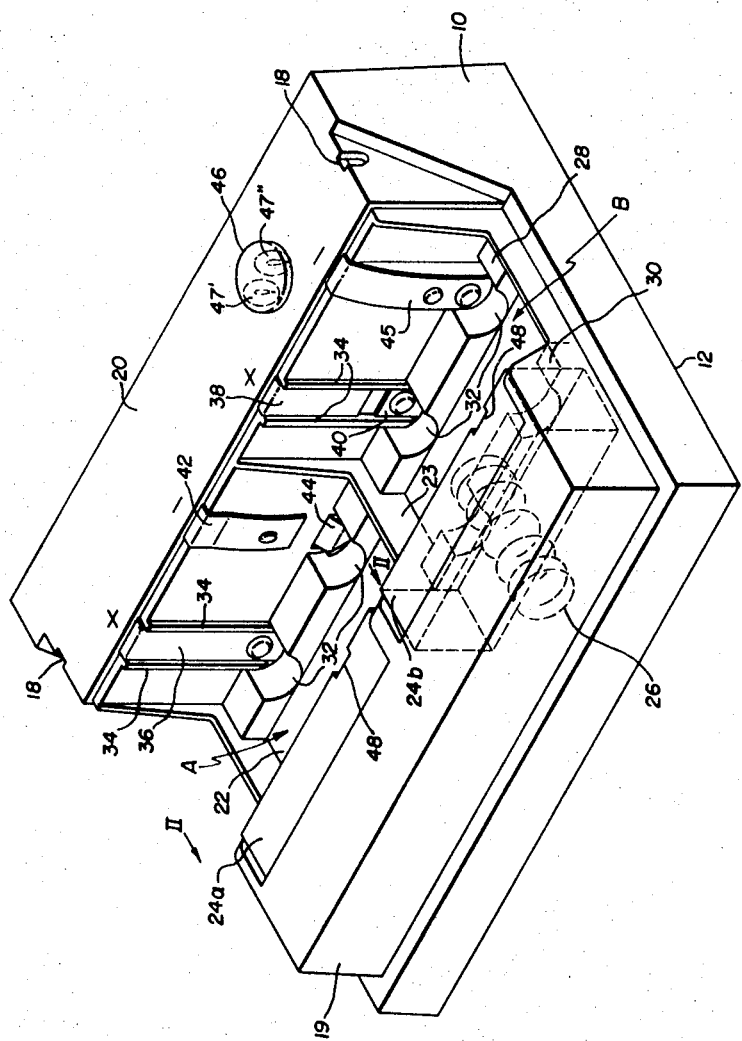
FIG. 1 is an isometric view of the battery charger of this invention.

Referring now to the drawings in which like numerals are used to indicate like parts throughout the various views thereof, FIG. 1 shows the device as including a molded plastic housing 10 which is boxlike in appearance and is enclosed by a bottom base plate 12. Optionally, the upper portion of housing 10 can be fitted with a removable lid (not shown) which is hingedly mountable on housing 10 by means of suitable projections formed on the lid inserted within holes 18 formed in the housing 10. The attachment of the lid is not necessary to practice the invention, but provides ornamental value and prevents dust from accumulating within the device.

The housing 10 is formed with a front transverse hollow wall 19, a rear transverse hollow wall 20, and a floor 22 disposed therebetween. The floor 22 is formed with a longitudinal divider wall 23 which separates the housing into two identical compartments A and B. The front wall 19 is open on the interior vertical side to receive two identical, contact carrying, boxlike members 24a and 24b which are open on one side to receive and retain springs 26 therein. The members 24a and 24b are slideably fit within the hollow front wall 19 and the springs 26 are compressed therebetween to form a telescoping box mechanism in which the members 24a and 24b move fore and aft with a spring bias toward the rear.

The floor 22 is formed with two transverse battery racks, rack 28 at the foot of wall 20 and rack 30 located sufficiently to the rear of the foot of wall 19 to allow the telescoping members 24a and 24b proper travel. Each rack is formed with cylindrical recesses 32 which retain and properly orient the batteries to be charged. In addition to retaining batteries, the rack 30 provides a stop means for restricting the travel of the members 24a and 24b. In order to prevent a user from charging batteries in reverse, ribs 34 are formed on the rear wall 20 adjacent each vertical edge of negative contacts 36, 38, and 40, so that the negative terminals of the batteries cannot make contact therewith if the battery is inadvertently inserted incorrectly. The ribs are sloped to protrude outwardly a greater distance adjacent the top of the charger than at the bottom for a purpose to be described presently. Positive contacts 42, 44, and 45 are bowed outwardly to provide a springlike feature which insures a proper electrical connection between each positive contact and a negative terminal of a battery forced thereagainst.

A translucent lens 46 is mounted on the top of rear wall 20 which lens 46 covers a pair of incandescent lamps 47' and 47" which are energized when the apparatus is properly charging. The lamps 47' and 47" thus serve as an indicator to the user and provide impedance to the charger circuitry which will be described later in the disclosure.

Figure 2:
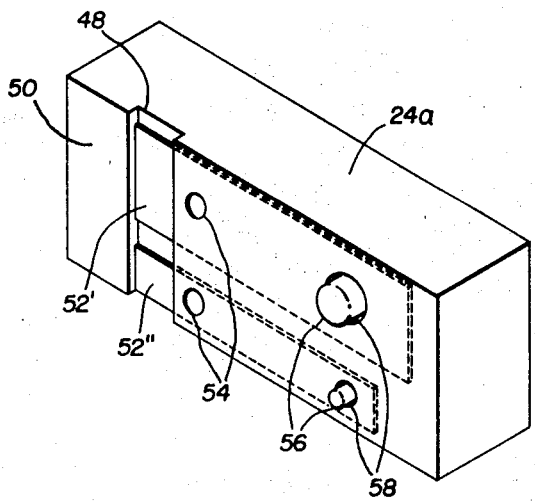
FIG. 2 is an isometric view of a portion of the charger of FIG. 1 taken along lines II—II and tilted.

As shown in FIG. 2, a vertical indentation 48 is formed in face 50 of identical members 24a and 24b. The indentation 48 is analogous to ribs 34 in that it performs the same function of preventing the reverse charging of batteries by precluding a negative battery terminal from contacting the negative charger contact mounted therein. The width of indentation 48 is therefore sized accordingly.

When battery is inserted within one of the recesses 32, the spring biased members 24a and 24b impinge upon and hold the battery in proper charging position. The necessary electrical contact means are provided in members 24a and 24b by two horizontal strips 52' and 52" formed of conductive material. Strips 52' and 52" are secured to the inside of the vertical face 50 by means of tacks 54. A contact button 56 is formed on one end of each of the strips 52' and 52" and protrudes from the rear to the front of the vertical face 50 through a hole 58 formed in the face 50. The other end of each strip 52' and 52" extends laterally into the indentation 48 where the strips 52' and 52" are mounted a sufficient distance to the rear of the face 50 to prevent the negative terminal of a battery from making contact therewith as previously discussed. Since the buttons 56 are attached to the free ends of each contact strip 52' 52", they are thereby provided with a cantilever spring action which insures proper contact between the buttons 56 and a batter terminal pressed thereagainst.

Figures 3, 4:
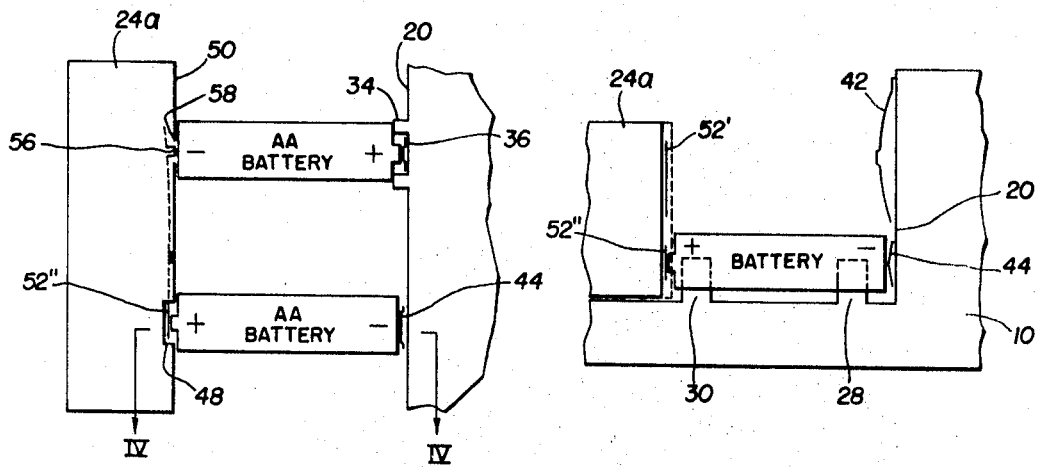
FIG. 3 is a schematic sketch illustrative of an arrangement as seen from the top of a portion of the charger.
FIG. 4 is a side-sectional view taken along lines IV–IV of the arrangement of FIG. 3.

FIGS. 3 and 4 show two small size batteries (e.g. AA) properly inserted within the retaining racks 28 and 30. One battery is connected between the contact 36 and the lower contact 52" on telescoping member 24a while the other battery electrically connects the lower contact 52" with the lower contact 44. It should be noted that when the small batteries are inserted, they are mechanically prevented from completing a circuit with the upper contacts 52' and 42 (as well as the upper portion of contact 36) by the sufficiently large diameter of the cylindrical recesses 32 as well as the sloped protrusion of the ribs 34 mentioned previously which are sufficiently shallow adjacent the bottom of the charger to permit electrical contact to be established with the positive terminal of the AA battery, yet sufficiently deep adjacent the upper contacts to prevent electrical contact at this point. As will be described later in the disclosure, the series connection formed by the small batteries between the contacts 36, 52" and 44 is part of an overall charging circuit which is designed especially for the particular electrical characteristics of such batteries.

Figure 5:
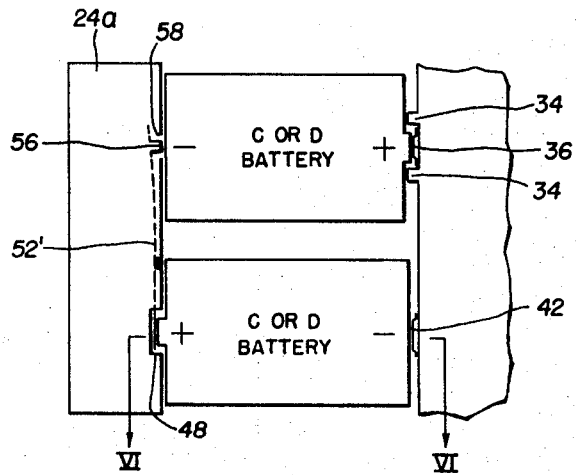
FIG. 5 is a schematic sketch illustrative of a second arrangement as seen from the top of a portion of the charger.
Figure 6:
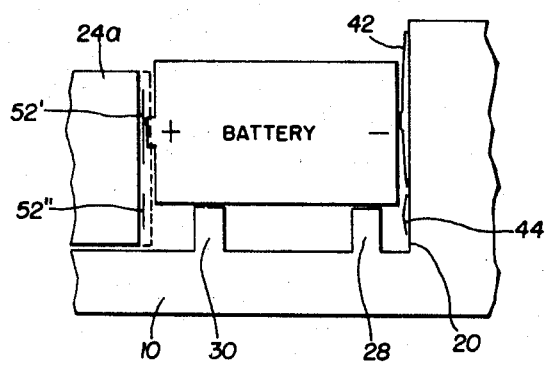
FIG. 6 is a side-sectional view of FIG. 5 taken along lines VI–VI.
Figure 7:
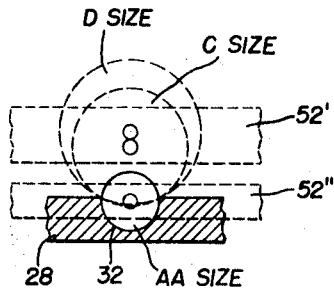
FIG. 7 is a cross-sectional sketch illustrative of the size relationships of the various batteries when inserted in the charger.

FIGS. 5 and 6 show two large size batteries (e.g. C and D) properly inserted within the charger. The positive terminals of one battery connects with contact 36 which is the only contact of this group designed to accommodate all size batteries. As best seen in FIG. 7, the circumference of the large battery prevents it from penetrating to any significant depth within the recess 32 and consequently from connecting with the lower contact 52". Instead, the battery connects the contact 36 with upper contact 52' and the second battery connects the upper contact 52' with the upper contact 42. Thus, a series connection is formed from contact 36 to 52' and formed from 52' to 42. As was true with the lower contacts 52" and 44 with respect to small batteries, the upper contacts 52' and 42 comprise part of an overall circuit designed to service cells with the electrical characteristics of large batteries. As described above, and illustrated in FIG. 7, the diameter of the recesses 32 in racks 28 and 30 mechanically discriminate the various types of cells according to physical size so that each cell completes a charging circuit specifically designed to provide the charging current required by the electrical characteristics of that cell. Only compartment A has been discussed here as compartment B is arranged in a manner substantially similar to that of compartment A with corresponding contacts, except that the common contact 35 in compartment B is the negative contact while the common contact 36 in compartment A is the positive contact. This physical arrangement is convenient for use with the electrical circuit of FIG. 8 to be described presently.

Figure 8:
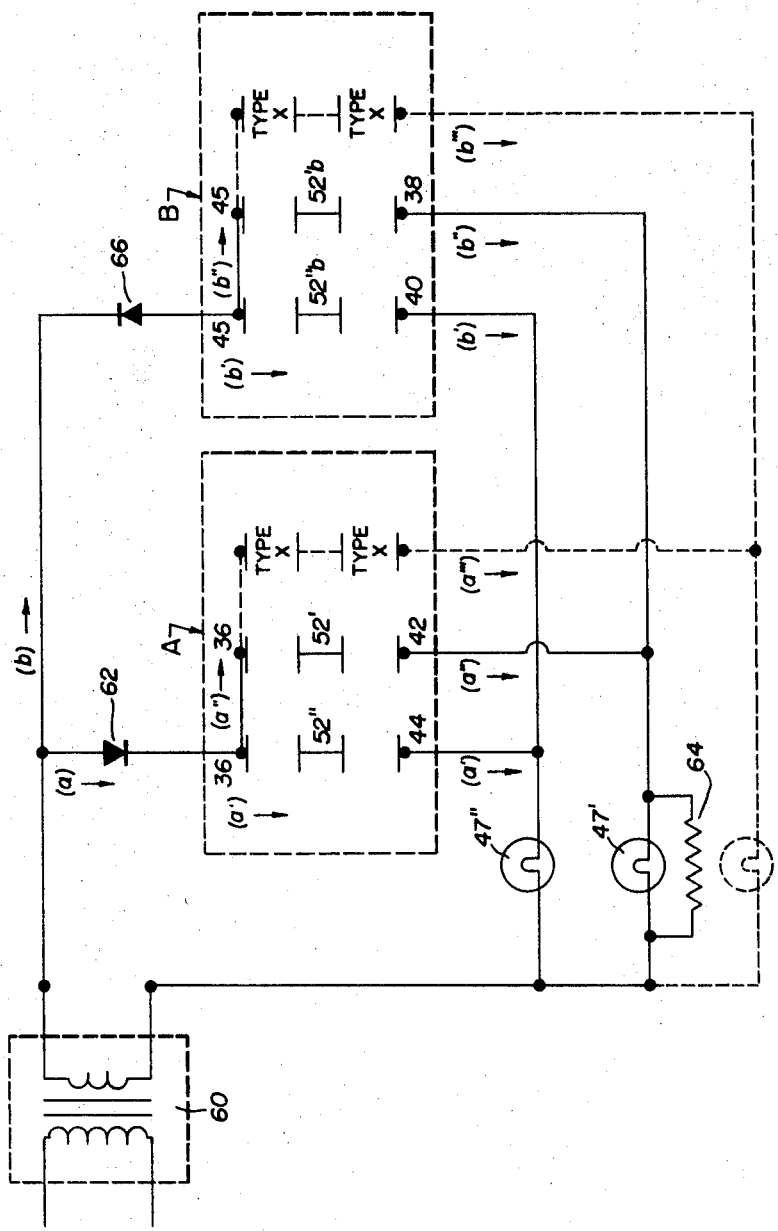
FIG. 8 is a schematic electrical circuit diagram of the charger.

FIG. 8 shows a diagram of the electrical charging circuit used in the device which includes a transformer 60 to convert standard 110—120 volt cycle AC current to approximately 6.7 v. AC. The circuit comprises two parallel branches, a and b, each of which services a corresponding cell compartment A and B. Tracing branch a, a diode 62 is connected between transformer 60 and the compartment A where two AA, C or D type cells are connected in series as previously described and shown in FIGS. 3—7. When AA type batteries are inserted, the circuit includes diode 62, contacts 36, 52", 44 and an incandescent lamp 47" which provides resistance and impedance values favorable to the electrical characteristics of AA type cells. By way of example, if a General Electric 047 lamp is used for lamp 47" the proper resistance is provided for charging 0.5 ampere-hour nickel-cadmium AA batteries. If C or D type cells are inserted, diode 62, contacts 36, 52', and 42 and lamp 47' with parallel resistor 64 shunted thereacross comprise the circuit which is designed for the electrical characteristics of C and D type cells. For example, a General Electric 044 lamp with a 47 ohm one-half watt resistor shunted thereacross provides the correct resistance for the charging current requirements of 1.0 ampere-hour nickel-cadmium C or D batteries. Branch b utilizes the same elements as branch a except that diode 66 of branch b is of opposite polarity to that of the diode 62 of branch a so that opposite lobes of the alternating current flow as half-wave rectified current through each branch a and b. It will be noted that branches a and b each comprise two branches a', a", b' and b" to meet the requirements of the various size cells. Additional branches may be connected as illustrated in dotted lines to accommodate any newly developed cell type X, as it is introduced on the domestic market. The type X cell would be permitted to contact only specially designed branches with a preselected current flow-limiting resistance by the same means of mechanical discrimination disclosed in the preceding paragraphs and shown in FIGS. 3—7.

The circuitry herein disclosed and shown in FIG. 8 is safe, of low cost and will accommodate various numbers and sizes of cells with minimum deviation from optimum charger currents, for each size cell, over typical ranges of operating conditions. The circuitry is of relatively high impedance with order to obtain the essentially constant currents desired for charging nickel-cadmium cells. Either one group, A, or two groups, A and B, of two cells each requiring the same charge current may be charged in this circuitry with good regulation using a common current limiting impedance. Since each of the two cell groups, A and B, receives current pulses from opposite lobes of the AC sine wave by the action of diodes 62 and 66, good current regulation is provided.

Figure 9:
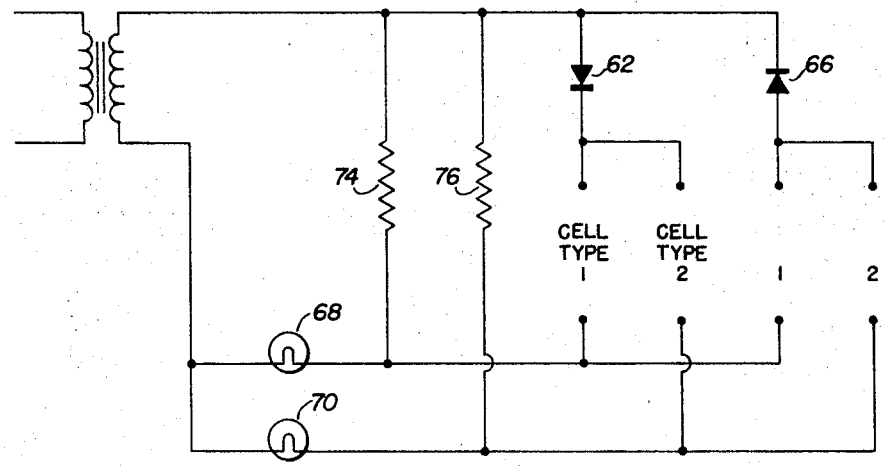
FIG. 9 is a schematic electrical circuit diagram of a variation of the circuit of FIG. 8.

Incandescent lamps 47' and 47" are included in the circuitry as impedance elements and as a positive indication that the cells are being charged. Some interaction between charge branches sharing the same lamp may result since the effective resistance of the lamp is dependent upon the rms current passing through it. This interaction may be reduced, if desired, by preloading the lamps 68 and 70, as shown in FIG. 9, with preload resistances 74 and 76. Resistors 74 and 76 hold the lamp temperature just below the visible level with no charging current, resulting in less difference in lamp resistance between charging one cell group and two cell groups through the common lamp. If it becomes necessary to adjust lamp brightness to a higher level than that provided by the desired charge current in order to visually indicate a charging condition, the preload resistances 74 and 76 can accomplish this by increasing the rms lamps current.

Figure 10:
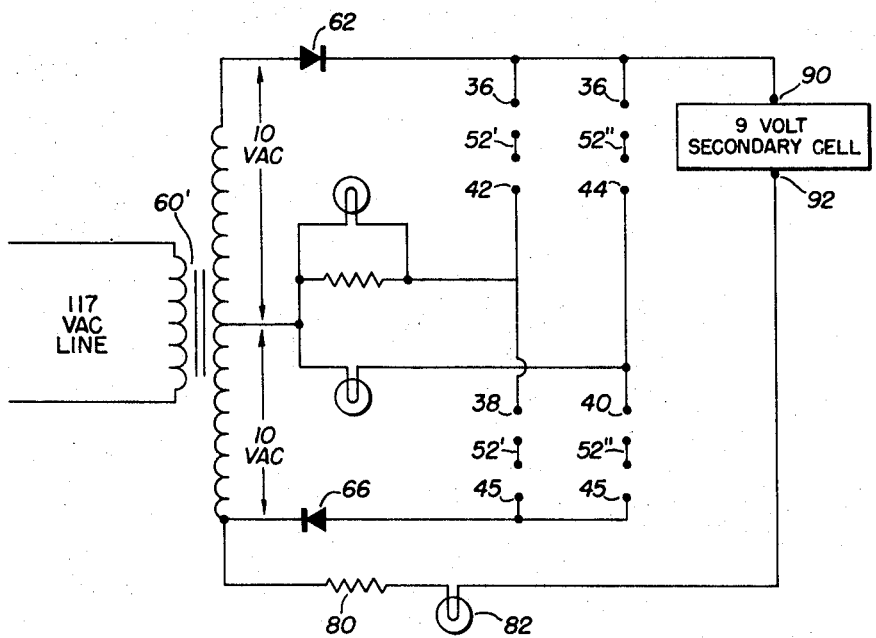
FIG. 10 is a schematic electrical circuit diagram of an alternate circuit for the charger.

Referring now to FIG. 10, an alternate circuit is illustrated wherein provision is made for charging 9-volt secondary cells. Transformer 60' has a 20-volt AC secondary with a center tap. The contacts in compartments A and B are then wired, as illustrated, using the center tap as neutral and using appropriate resistances. Using diode 62, a circuit is provided across the entire secondary winding through resistor 80 and lamp 82 to provide proper charging voltage and current flow to a 9-volt secondary cell at terminals 90 and 92.

The 9-volt charging terminals can be physically housed in a suitable compartment in charger 10 or they may be attached to the case via a cable in which case terminals 90 and 92 could be shaped in the well known male and female snap configuration of such 9-volt batteries to insure correct polarity.

It can be readily seen that a compact battery charging device for recharging batteries of various physical sizes and electrical capabilities is herein provided. Two batteries or four batteries may be charged simultaneously with the only requirement being that each group of two cells be of the same type. A single battery may be charged if a dummy battery adapter is inserted in place of the second battery to properly complete the charger circuit. The apparatus is foolproof in that batteries cannot be charged in reverse and each battery will be automatically charged with an optimum charge current for that type battery.

It should be understood that, while there has been shown and described a particular embodiment of the invention, it will be obvious to those skilled in the art that various changes and modifications may be made without departing from the spirit and scope of the invention as set forth in the claims appended hereto.

I claim:

1. A battery charging device comprising: a housing, a battery charging circuit in said housing provided with a plurality of circuit branches, means for connecting said battery charging circuit with an electrical energy source, respective impedance means connected with each of said circuit branches so as to provide in each of said circuit branches a predetermined optimum charge circuit have a corresponding battery size, and discriminating means including a battery retaining means in said housing arranged to simultaneously and alternatively accommodate at least two different physical sizes of battery cells, at least two of which cells have different electrical characteristics, said discriminating means further including electrical contact means whereby said respective cells can be selectively connected with each of said circuit branches.

2. A battery charging device according to claim 1, said housing including a floor portion, said battery retaining means of said discriminating means comprising means forming a plurality of recesses in said floor portion, said electrical contact means including respective electrical contact pairs positioned adjacent each of said recesses and connected into respective ones of said circuit branches, each electrical contact of a respective contact pair being positioned with respect to said recesses so that a respective one circuit branch into which said electrical contact is connected can conduct current only when a particular one batter cell size is positioned adjacent said contact.

3. The device according to claim 1 wherein said battery charging circuit includes: transformer means and current rectifying means; said impedance means comprising incandescent lamp means connected into said circuit branches and having predetermined different impedance values, corresponding to said predetermined optimum charge current.

4. The device according to claim 2 wherein: said electrical contact pairs of said discriminating means include negative and positive charger contact pairs, said battery retaining means of said discriminating means including means adjacent to edges of the positive charger contact pairs to prevent a negative battery terminal from making electrical contact therewith.

5. The device according to claim 4, said housing defining a face, said means adjacent said edges including indentations formed in said housing face adjacent said retaining means, said positive contact pairs being mounted within said indentations to preclude a negative battery terminal of a battery cell within said retaining means from making electrical contact with a positive charger contact.

6. The device according to claim 3, said incandescent lamp means including an incandescent lamp and resistance means in parallel with said lamp in said circuit branch to increase the charge current in said branch so as to achieve said predetermined optimum current therein.

7. The device according to claim 3, said incandescent lamp means including an incandescent lamp and resistance means in series with said lamp in said circuit branch to decrease the charge current in said branch so as to achieve said predetermined optimum current therein.

8. The device according to claim 3, said incandescent lamp means comprising a plurality of incandescent lamps, said housing being provided with a translucent lens mounted in a wall of said housing and positioned covering a plurality of said incandescent lamps for viewing various combinations of lamp brightness through the housing wall.

9. The device according to claim 3, said circuit branches including individual sets of parallel branch circuits, said current rectifying means including a plurality of diodes electrically connected in said battery charging circuit, one of said diodes being connected to a first set of said parallel branch circuits to conduct electrical energy through said first set of circuits during one half cycle, and another of said diodes being connected to a second set of said parallel branch circuits to conduct electrical energy through said second set of parallel branch circuits during the opposite half cycle.

10. The device according to claim 4, said housing defining a face, said means adjacent said edges including rib means protruding from said housing face adjacent said retaining means and disposed adjacent the edges of the positive charger contact pairs, said means forming the recesses in said housing floor portion being positioned relative to said protruding rib means to preclude a negative battery terminal of a battery cell from making contact with a positive charger contact of a respective contact pair.

11. The device according to claim 1, said discriminating means including sloping protruding rib means disposed adjacent said battery retaining means and arranged so as to correspond in depth to the protruding length of the positive battery contact of a respective cell size and so as to preclude contact of said positive battery contact beyond said rib means at predetermined zones along the slope of said rib means.

12. The device according to claim 1, said housing defining a vertical face, and indentation means formed in said face adjacent said retainer means, said indentation means defining a plurality of surfaces defining zones disposed at different depth distances from said face so as to correspond in depth to the protruding length of the positive battery contact of a respective cell size so as to preclude contact of said positive battery contact beyond predetermined indentation depths at predetermined zones.